(12) United States Patent
Crary et al.

(10) Patent No.: US 11,762,102 B2
(45) Date of Patent: Sep. 19, 2023

(54) TIMING ERROR ADJUSTMENT IN MOBILE DEVICES

(71) Applicant: QUALCOMM Incorporated, San Diego, CA (US)

(72) Inventors: Philip Crary, Mission Viejo, CA (US); Troy Li, Irvine, CA (US); Scott Scigliano, Orange, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 16/803,410

(22) Filed: Feb. 27, 2020

(65) Prior Publication Data

US 2021/0270974 A1    Sep. 2, 2021

(51) Int. Cl.
*G01S 19/23* (2010.01)
*G01S 19/34* (2010.01)

(52) U.S. Cl.
CPC .......... *G01S 19/23* (2013.01); *G01S 19/235* (2013.01); *G01S 19/34* (2013.01)

(58) Field of Classification Search
CPC ........ G01S 19/23; G01S 19/235; G01S 19/34; H04B 1/70754
See application file for complete search history.

(56) References Cited

U.S. PATENT DOCUMENTS 5,854,605 A * 12/1998 Gildea ................. G01S 19/235
                                                    342/357.62
6,473,607 B1 * 10/2002 Shohara ............ H04W 52/0293
                                                    455/208
6,683,564 B1 * 1/2004 McBurney .............. G01S 19/25
                                                    701/472
(Continued)

FOREIGN PATENT DOCUMENTS

| EP | 3056865 B1 * | 9/2019 | ........... G01D 3/0365 |
| WO | WO-03038464 A2 * | 5/2003 | ............. G01S 19/23 |
| WO | 2008021810 | 2/2008 | |

OTHER PUBLICATIONS

MathWorks, Remove Spikes from a Signal, https://www.mathworks.com/help/signal/ug/remove-spikes-from-a-signal.html, 3 pages, Feb. 2018 (Year: 2018).*

(Continued)

*Primary Examiner* — Bernarr E Gregory
*Assistant Examiner* — Fred H Mull
(74) *Attorney, Agent, or Firm* — Thien T. Nguyen (57) ABSTRACT

System and method for adjusting timing error in a mobile device. In the mobile device, a crystal oscillator (XO) is used by a system timer as the timing source. When the mobile device enters into a sleep mode, the system timer is set to time the duration of the sleep mode. During the sleep mode, a thermistor is used to measure and monitor the temperature changes of the XO. After the sleep mode is over, a processor in the mobile device determines the frequency changes of the XO based on the temperature changes of the XO. Based on the frequency changes of the XO, the processor determines the timing error that may have occurred when the system timer was timing the sleep mode and determines the actual duration of the sleep mode by adjusting the duration timed by the system timer based on the timing error.

24 Claims, 6 Drawing Sheets

(56) References Cited

U.S. PATENT DOCUMENTS

| | | | |
|---|---|---|---|
| 8,373,515 B2* | 2/2013 | Anandakumar | G01S 19/235 331/158 |
| 2003/0034848 A1 | 2/2003 | Norman et al. | |
| 2003/0086396 A1* | 5/2003 | Gurski | H04B 1/70754 370/335 |
| 2006/0214847 A1* | 9/2006 | McBurney | G01S 19/23 342/357.64 |
| 2007/0104298 A1 | 5/2007 | Filipovic et al. | |
| 2007/0152876 A1* | 7/2007 | Wang | G01S 19/23 342/357.65 |
| 2007/0152878 A1* | 7/2007 | Wang | G01S 19/34 342/357.68 |
| 2012/0094683 A1* | 4/2012 | Yoeli | G01S 5/0027 455/456.1 |
| 2016/0116598 A1 | 4/2016 | Wu et al. | |

OTHER PUBLICATIONS

International Search Report and Written Opinion—PCT/US2021/070196—ISA/EPO—dated Jun. 11, 2021.

* cited by examiner

TIMING ERROR ADJUSTMENT IN MOBILE DEVICES

FIELD OF DISCLOSURE

Disclosed aspects are directed to adjusting timing errors in mobile devices. More particularly, exemplary aspects are directed to making adjustments to timing errors caused by temperature changes occurring in a crystal oscillator (XO).

BACKGROUND

Global navigation satellite systems (GNSS) are well known in applications related to tracking and positioning. GNSS systems such as global positioning systems (GPS) are satellite-based systems used for pinpointing a precise location of a GNSS receiver or object capable of tracking satellite signals. With advances in GNSS technology, it is possible to locate and track movements of an object on the globe.

GNSS systems operate by configuring a GNSS satellite to transmit certain signals which may include pre-established codes. These signals are based on a GNSS time or satellite time derived from an atomic clock or satellite clock present in the satellite. The transmitted signals may include a time stamp indicating the time at which they were transmitted. A GNSS receiver, which may be integrated in a handheld device, is timed by a local clock located at the receiver end. Ideally, this local clock is synchronized to the satellite clock (also known as the GNSS time). The device comprising the GNSS receiver is configured to estimate the GNSS time based on the satellite signals in order to synchronize their local clocks to the GNSS time. Once the local clocks are accurately synchronized, the device is configured to calculate the propagation time for the satellite signals to reach the receiver, based on a difference between the time at which the signals were received, and the time at which they were transmitted. This propagation time is an indication of the distance between the satellite and the device, keeping in mind that factors such as atmospheric conditions may affect the propagation time.

In order to pinpoint the location of the device, the device performs the above process to calculate the distance to two or more other satellites (if altitude and/or local time of the device is known, the location can be determined with a total of three satellites, otherwise, a total of four satellites may be needed). Using the distances to the satellites, it is theoretically possible to "trilaterate" the position of the device. However, practical applications diverge from theoretical expectations due to several sources of inaccuracies inherent in GNSS based positioning.

Therefore, GNSS systems need to know the time exactly to pinpoint the locations of the satellites. However, GNSS systems consume power, and the power consumption is becoming a growing problem for these systems. In order to reduce the power consumption, some systems turn themselves off (power down or sleep) to reduce power consumption. When these systems wake up from a sleep, they need to know the exact time as explained above. The GNSS systems must know the exact current time so that they can quickly pinpoint the locations of the positioning satellites after the GNSS systems wake up from a sleep. Knowing the exact time reduces the time needed to search for the positioning satellites. Thus, knowing the exact time after waking from a sleep saves time and power that are used to search for positioning satellites.

However, in many GNSS systems, the timers in the systems are driven by crystal oscillators (XO). These XOs typically change their oscillation frequencies based on their temperature. Usually, an XO's environment (such as air, chip and board temperatures) affects the temperature of the XO. When the temperature of the XO changes, the frequency of the XO also changes, and the frequency change causes timing errors in a timer that uses the XO.

In order to compensate for such timing errors, GNSS systems are forced to search for satellites by assuming the worst case timing error. By assuming the worst case timing error, the search window time frame (i.e., the time used to search for satellites) needs to be increased. For example, if a GNSS system knows the exact time after waking from a sleep, it may only need to spend 0.1 seconds to locate the positioning satellites. However, if the GNSS system does not know the exact time because of timing errors caused by the frequency drift of the XO, the GNSS system may need to spend 2 seconds to search for the positioning satellites since the system has to assume the worst case scenario for timing error. As explained above, such large search time window consumes unnecessary power and time.

Accordingly, there is a need for systems and methods that reduce timing errors caused by frequency drift and temperature changes of XOs in GNSS systems.

SUMMARY

Exemplary aspects of the disclosure are directed to systems and methods for adjusting a timing error in a mobile device.

For example, an exemplary aspect is directed to a method of adjusting a timing error in a mobile device, the method comprising: setting a timer to time a duration; measuring temperature changes of an oscillator used as a source for the timer during the duration; determining frequency changes of the oscillator that occurred during the duration based on the temperature changes; and determining the timing error of the timer while timing the duration based on the frequency changes of the oscillator. The method further comprises: determining an actual duration by adjusting the duration based on the determined timing error; locating a satellite based on the actual duration; storing the measured temperature changes in a memory; filtering the stored temperature changes; and ignoring the stored monitored temperature changes if a change in the temperature changes exceeds a predetermined threshold.

Another exemplary aspect is directed to a mobile device comprising: an oscillator; a timer coupled to the oscillator to receive oscillation signals from the oscillator; a thermistor coupled to the oscillator to measure temperature changes of the oscillator; and a processor configured to: set the timer to time a duration; determine frequency changes of the oscillation signals from the oscillator that occurred during the duration based on the monitored temperature changes that occurred during the duration; and determine a timing error of the timer that occurred while timing the duration based on the determined frequency changes of the oscillator. The processor is further configured to: determine an actual duration by adjusting the duration based on the determined timing error and store the measured temperature changes in a memory and filter the stored temperature changes.

Another exemplary aspect is directed to a mobile device comprising: means for setting a timer to time a duration; means for measuring temperature changes of an oscillator used as a source for the timer during the duration; means for determining frequency changes of the oscillator that occurred during the duration based on the temperature changes; and means for determining the timing error of the timer while timing the duration based on the frequency changes of the oscillator. The mobile device further comprises: means for determining an actual duration by adjusting the duration based on the determined timing error; means for locating a satellite based on the actual duration; storing the measured temperature changes in a memory; means for filtering the stored temperature changes; and means for ignoring the stored monitored temperature changes if a change in the temperature changes exceeds a predetermined threshold, Yet another exemplary aspect is directed to a non-transitory computer-readable storage medium comprising code, which, when executed by a processor, causes the processor to perform operations for adjusting a timing error in a mobile device, the non-transitory computer-readable storage medium comprising: code for setting a timer to time a duration; code for measuring temperature changes of an oscillator used as a source for the timer during the duration; code for determining frequency changes of the oscillator that occurred during the duration based on the temperature changes; and code for determining the timing error of the timer while timing the duration based on the frequency changes of the oscillator. The non-transitory computer-readable storage medium further comprising: code for determining an actual duration by adjusting the duration based on the determined timing error; code for locating a satellite based on the actual duration; storing the measured temperature changes in a memory; code for filtering the stored temperature changes; and code for ignoring the stored measured temperature changes if a change in the temperature changes exceeds a predetermined threshold.

BRIEF DESCRIPTION OF THE DRAWINGS

The accompanying drawings are presented to aid in the description of aspects and are provided solely for illustration of the aspects and not limitation thereof.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts The word "exemplary" is used herein to mean "serving as an example, instance, or illustration." Any aspect described herein as "exemplary" is not necessarily to be construed as preferred or advantageous over other aspects. Likewise, the term "aspects of the disclosure" does not require that all aspects of the disclosure include the discussed feature, advantage or mode of operation.

The terminology used herein is for the purpose of describing particular aspects only and is not intended to be limiting of aspects of the disclosure. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Aspects of the present disclosure are directed to determining the actual duration of the sleep mode (i.e., the time during which a GNSS system powers down) of a GNSS system based on the temperature changes and consequential frequency drift of an XO in the GNSS system. The actual duration is determined by first determining the timing errors caused by the frequency drift of the XO and adjusting the original duration of the sleep mode by the timing errors. The aspects of the present disclosure allow for accurate determination of the actual duration of the sleep mode by determining the timing errors that may occur during the sleep mode.

Figure 1:
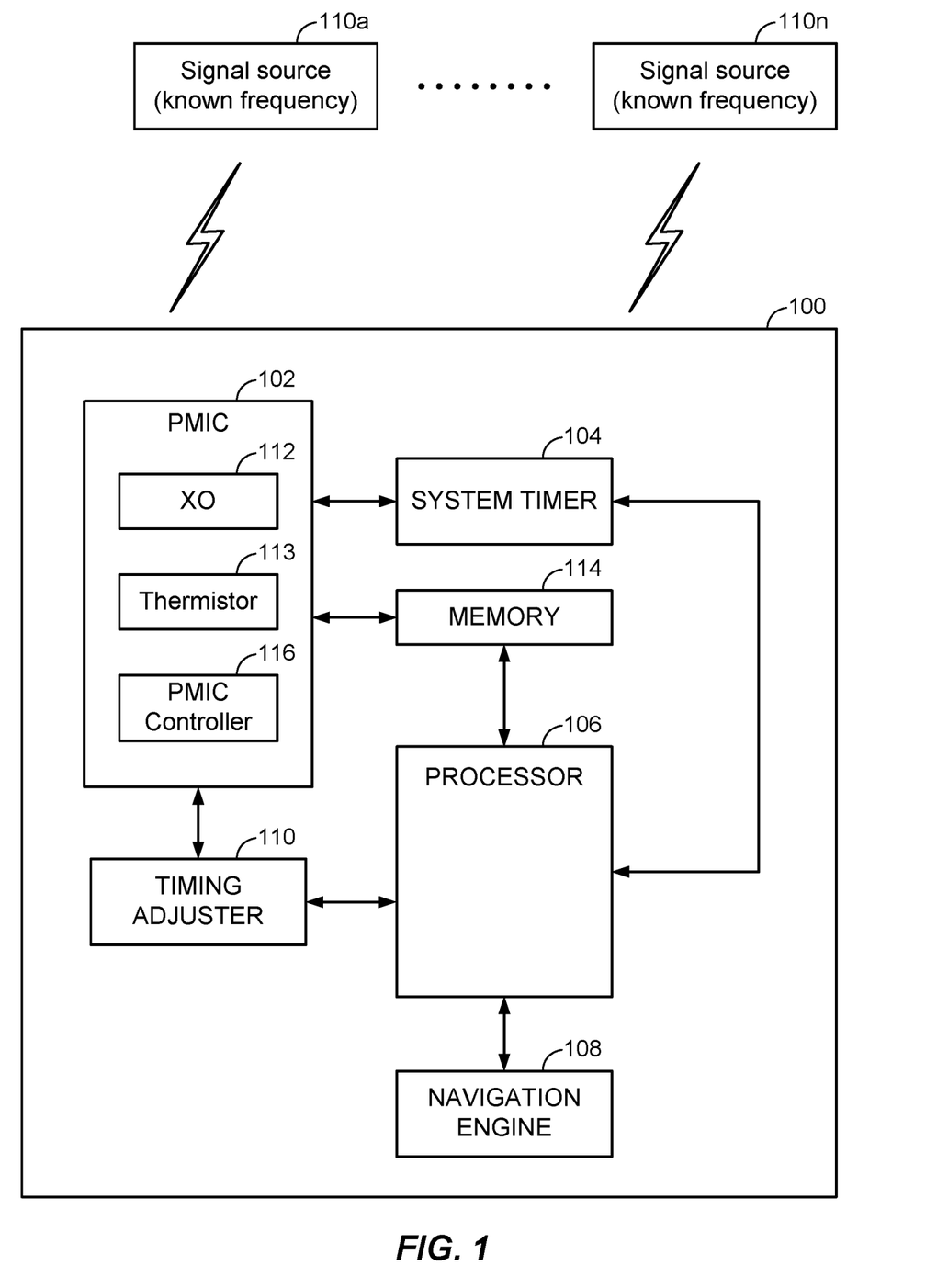
FIG. 1 illustrates a simplified schematic diagram of a device to adjust for timing error in a GNSS system according to various aspects of the disclosure.

With reference to FIG. 1, a simplified schematic of an exemplary device 100 configured for determining the actual duration of the sleep mode of a GNSS system according to exemplary aspects is illustrated. It will be noted that device 100 may pertain to a mobile device or handheld device and may further comprise one or more components as known to one skilled in the art, but which are not illustrated in FIG. 1, for the sake of clarity (although FIG. 3 provides other exemplary aspects directed to devices similar to device 100, which illustrate certain other components which may be included in the exemplary devices). Device 100 may comprise navigation engine 108, which may be configured to receive wireless signals from various sources such as, one or more signal sources 110a-n. In one non-limiting example, one or more of signal sources 110a-n may be satellite or GNSS sources capable of providing GNSS fixes, including geo-stationary sources such as a satellite based augmentation system (SBAS). Additionally and optionally, one or more signal sources 110a-n may also be calibrated terrestrial sources, such as WWAN or CDMA. Navigation engine 108 may be driven by system timer 104 which can be sourced from XO 112.

As illustrated in FIG. 1, PMIC (Power Management Integrated Circuit) 102 includes PMIC controller 116, XO 112 and thermistor 113. XO 112 may be a crystal oscillator or any other type of oscillator that vibrates at certain frequency. PMIC controller 116 may be a general purpose processor (CPU) or a controller designed to control the operation of PMIC 102. Thermistor 113 is closely coupled with XO 112 to measure and monitor the temperature of XO 112. Memory 114 is coupled with PMIC 102. In an aspect, memory 114 may be included in PMIC 102, but in another aspect, memory 114 may be placed outside of PMIC 102.

As shown in FIG. 1, system timer 104 is coupled to PMIC 102. System timer 104 receives the output of XO 112 and uses the output of XO 112 as the timing source. System timer 104 may be the main timer for device 100. For example, system timer 104 can be used to time the duration of the sleep mode of device 100. Device 100 may enter into sleep mode or low power mode to save power consumption. The duration of the sleep mode is timed by system timer 104.

Processor 106 controls the operation of device 100. Processor 106 may be one or more multi-core integrated circuits designated for general or specific processing tasks. The processor 106 maybe a system-on-chip (SOC), which may include a general-purpose processor (CPU) or multi-core general-purpose processors (CPUs). Processor 106 may set the duration of the sleep mode by using system timer 104. Processor 106 is coupled to other components in device 100 to control the operation of device 100. The operation of processor 106 is explained below.

As mentioned above, navigation engine 108 may be configured to receive wireless signals from various sources such as, one or more signal sources 110a-n. Navigation engine 108 may include a receiver that is able to receive signals from various sources including GNSS sources such as satellites. Navigation engine 108 may use the signals from GNSS sources to determine the location of device 100.

As shown in FIG. 1, device 100 further comprises timing adjuster 110. In an exemplary aspect, processor 106 may use timing adjuster 110 to keep track of the timing errors caused by the temperature fluctuations of XO 112. In another exemplary aspect, processor 106 may not use timing adjuster 110 to keep track of the timing errors but may determine the timing error on its own.

In an exemplary aspect, device 100 enters into a sleep mode or low power mode when processor 106 powers down certain components in device 100 to save power consumption. Reducing the power consumption of device 100 may increase the battery life of device 100. Right before device 100 enters into the sleep mode, processor 106 may store the current time, current location of the navigation satellite and the current location of device 100 in memory 114 or any other available memory (not shown). The stored time and current locations may be used to find the position of the navigation satellite when the device 100 wakes up from the sleep mode.

In addition to storing the time and the current locations, processor 106 may instruct system timer 104 to time the duration of the sleep mode. Processor 106 instructs system timer 104 to measure the duration of the sleep mode as determined by processor 106. For example, processor 106 may determine the duration of the sleep mode to be 10 seconds. Processor 106 then instructs system timer 104 to time 10 seconds for the sleep mode. When system timer 104 finishes timing the duration of the sleep mode, system timer 104 sends an alert to processor 106 to alert processor 106 that the sleep mode has ended. So, going back to the previous example, when system timer 104 finishes timing the 10 seconds for the sleep mode, system timer 104 alerts processor 106.

When device 100 enters into the sleep mode, most of the components in device 100 including processor 106 may shut down or enter into a low power mode to reduce power consumption. However, during the sleep mode, XO 112 continues to output oscillating signals used by system timer 104 to time the duration of the sleep mode as directed by processor 106. During the sleep mode, thermistor 113, which is closely coupled with XO 112, outputs data that corresponds to the temperature change of XO 112. Thermistor 113 may be adjacent to XO 112 or actually touch XO 112 to accurately measure the temperature changes of XO 112. Thermistor 113 may be on top, below or next to XO 112 in close proximity. In some aspects the thermistor 113 and XO 112 may be integrated into a common component and/or package. The temperature of XO 112 may be affected by the environment surrounding XO 112 such as the board temperature, temperature of other components in device 100 and air temperature surrounding XO 112. Thermistor 113 measures and/or monitors the temperature changes of XO 112 and outputs data that may be stored in memory 114 by PMIC controller 116. The frequency of the data output from thermistor 113 or the sampling rate of the data from thermistor 113 may be controlled by PMIC controller 116. However, PMIC controller 116 may control the sampling rate based on an instruction from processor 106. PMIC controller 116 stores the output data from thermistor 113 until the end of the sleep mode.

In one exemplary aspect, timing adjuster 110 may not be used to determine the actual duration of the sleep mode. In this aspect, system timer 104 alerts processor 106 and PMIC controller 116 when the sleep mode has ended based on the duration of the sleep mode set by processor 106. As discussed above, system timer 104 uses the output of XO 112 as the source signal to time the duration of the sleep mode. However, the temperature of XO 112 may have fluctuated during the sleep mode, resulting in a frequency drift of the output signal of XO 112. The frequency drift of XO 112 may cause timing errors in system timer 104. When processor 106 receives the alert from system timer 104 to wake up, processor 106 wakes up other components in device 100 and starts to read the output data from thermistor 113 that were stored in memory 114.

Processor 106 may filter the output data from thermistor 113 using various techniques known in the art. After filtering the data, processor 106 converts the output data from thermistor 113 into direct temperature data. The data from thermistor 113 may not give direct temperature data, so processor 106 may need to convert the output data from thermistor 113 into direct temperature data. Based on the direct temperature data, processor 106 may determine the frequency changes or drift of the output signal of XO 112. Processor 106 may reference an S-curve for XO 112 such as S-curve 200 shown in FIG. 2 to determine the frequency changes of XO 112 caused by temperature changes of XO 112. S-curve 200 shows how the frequency of XO 112 may change in ppm (parts per million) based on the temperature of XO 112. For example, S-curve 200 shows that the frequency of XO 112 in general increases as the temperature of XO 112 increases and that the frequency of XO 112 in general decreases as the temperature of XO 112 decreases.

Figure 2:
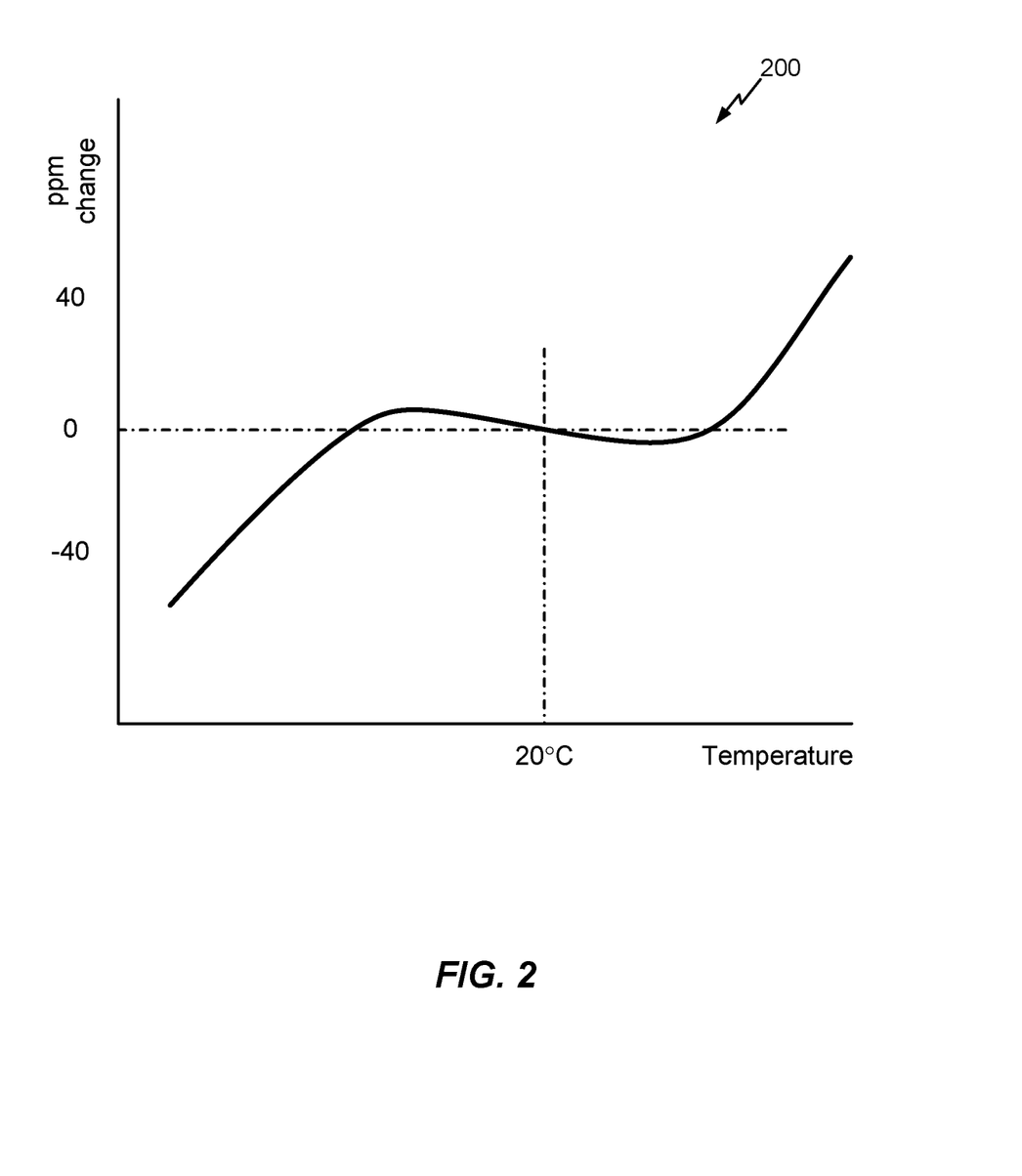
FIG. 2 illustrates an S-curve for an exemplary crystal oscillator.

However, S-curve 200 is just one example of an S-curve, and XO 112 may use another S-curve depending on the type of crystal oscillator used for XO 112.

By referencing S-curve 200 using the direct temperature data, processor 106 can determine how the frequency of XO 112 changed during the sleep mode. Based on the frequency changes of XO 112 during the sleep mode, processor 106 may determine how the frequency changes affected the timing of system timer 104 during the sleep mode. For example, the duration of the sleep mode can be set to 10 seconds, but the actual duration of the sleep mode could end up becoming either 9.5 or 10.5 seconds because of the frequency change of XO 112 caused by the temperature changes of XO 112 during the sleep mode. However, processor 106 can determine the timing error that occurred in system timer 104 based on the frequency changes that occurred in the output signal of XO 112. Based on the determined timing error, processor 106 may determine the actual duration of the sleep mode. In other words, the actual duration of the sleep mode is determined by adjusting the duration timed by the system timer 104 based on the frequency changes of XO 112 and the subsequent timing error caused by the frequency changes of XO 112.

After determining the actual duration of the sleep mode, processor 106 may transmit the actual duration to navigation engine 108 to pinpoint the location of the positioning or navigation satellite. Since navigation engine 108 knows the actual duration of the sleep mode, navigation engine 108 can quickly pinpoint the location of the positioning satellite based on the actual time that has passed during the sleep mode. This saves time and power consumption. However, if the navigation engine 108 does not know the actual duration of the sleep mode, navigation engine 108 is forced to search for the positioning satellite over the largest necessary search time window accounting for the worst case frequency change scenario. Such large search time window wastes time and increases power consumption.

In an aspect, if processor 106 finds a large spike that surpasses certain threshold in the temperature data from thermistor 113, processor 106 may determine that a system error has occurred in device 100. If processor 106 determines that a system error has occurred, processor 106 may ignore the temperature data collected from thermistor 113 and direct navigation engine 108 to search for the positioning satellite over the largest necessary search time window accounting for the worst case frequency change scenario. A large spike in the temperature data may indicate that a system error has occurred in device 100.

In another exemplary aspect, timing adjuster 110 may be used to determine the timing error that results from the frequency changes or drift of XO 112. In this aspect, timing adjuster 110 dynamically receives the output data from thermistor 113 during the sleep mode, converts the thermistor 113 data to the direct temperature data and uses the direct temperature data to determine the frequency changes of XO 112. So instead of storing the thermistor 113 data, timing adjuster 110 dynamically receives the thermistor 113 data and uses the data to determine the frequency changes of XO 112. Timing adjuster 110 may reference S-curve 200 shown in FIG. 2 to determine the frequency changes of XO 112. Based on the frequency changes of XO 112, timing adjuster 110 dynamically determines the timing error that occurs in system timer 104 as a result of the frequency changes of XO 112. When device 100 wakes up from the sleep mode, timing adjuster 110 transmits the final timing error or adjustment to processor 106. Processor 106 determines the actual duration of the sleep mode based on the final timing error or adjustment received from timing adjuster 110.

Figure 3A:
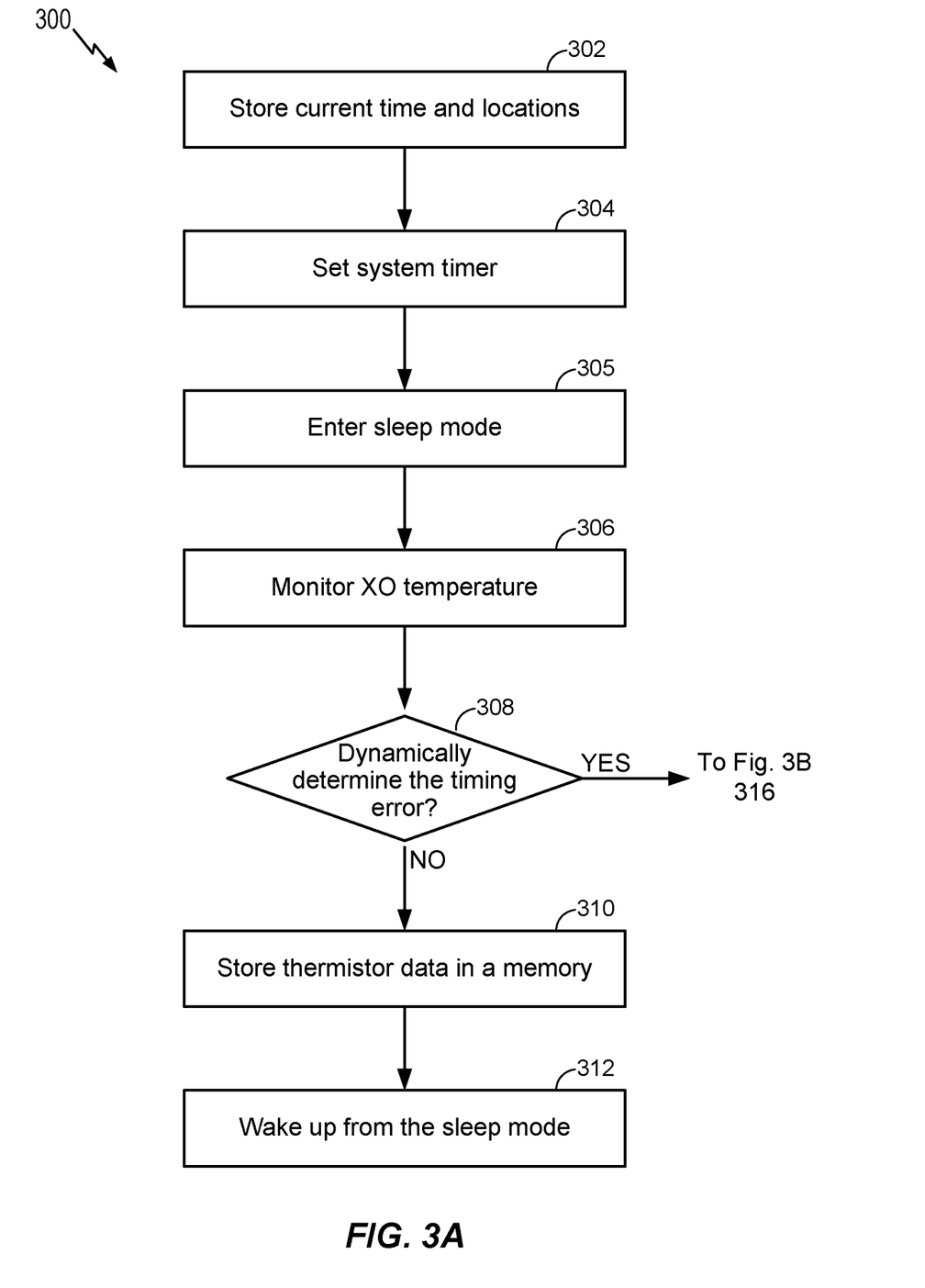
FIGS. 3A-3B illustrate flowcharts corresponding to one or more methods of timing error adjustment according to various aspects of the disclosure.
Figure 3B:
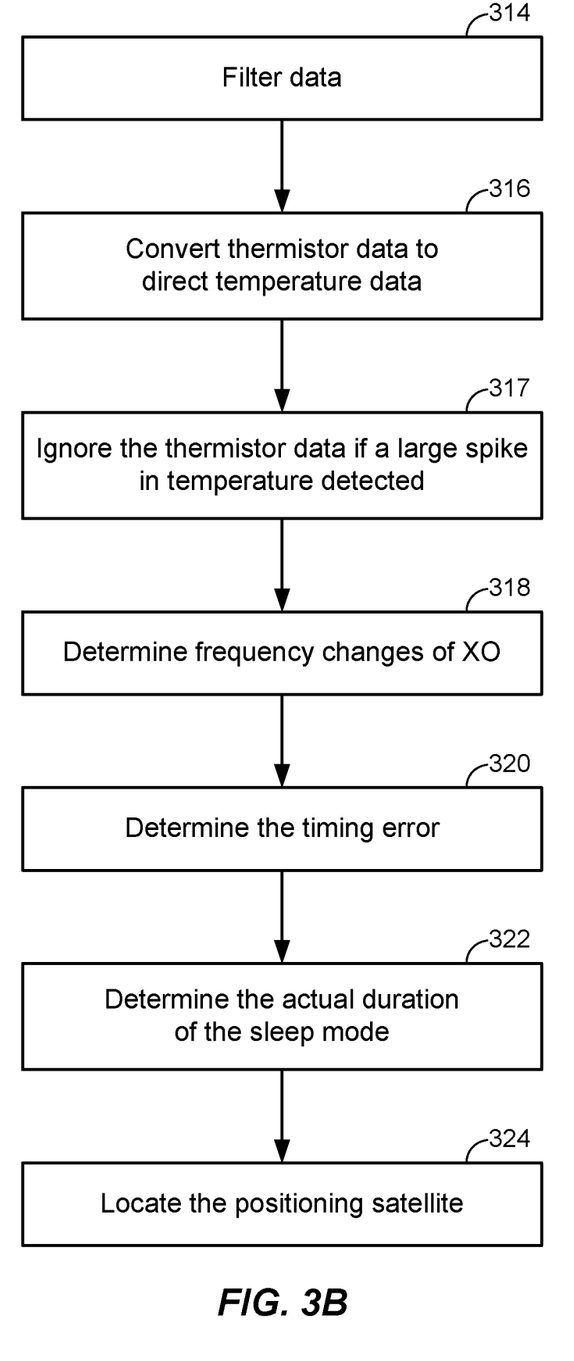

It will be appreciated that aspects include various methods for performing the processes, functions and/or algorithms disclosed herein. For example, FIGS. 3A and 3B show a method 300 for adjusting a timing error in a mobile device. The method may be performed by a device such as device 100 including processor 106, PMIC controller 116 and timing adjuster 110. In one configuration, the method 300 described in FIGS. 3A and 3B may be performed by the mobile device 400 described below with reference to FIG. 4.

At block 302, the method stores current time and current locations of the positioning satellite and device 100 before entering into a sleep mode. The current time and locations may be stored in a memory.

At block 304, the method sets a system timer to time the duration of the sleep mode. The duration may be predetermined, and the system timer times the duration. Processor 106 may set system timer 104 to time the duration of the sleep mode.

At block 305, the method enters into the sleep mode. Processor 106 may power down components in device 100 to enter into the sleep mode.

At block 306, during the sleep mode, the method measures and monitors the temperature of an XO such as XO 112 by using a thermistor such as thermistor 113. The thermistor outputs temperature data of the XO.

At block 308, the method determines whether to dynamically determine the timing error caused by the temperature changes of XO. If so, the method jumps to block 316. If not, the method proceeds to block 310.

At block 310, the method stores the output data from thermistor 113 in a memory such as memory 114.

At block 312, the method wakes up from the sleep mode. The system timer 104 alerts processor 106 to wake up from the sleep mode when the duration of the sleep mode reaches the end. Processor 106 may wake up other components in device 100.

At block 314, the method filters the stored thermistor data in the memory in accordance to various filtering algorithms known in the art. Processor 106 may filter the output data from thermistor 113.

At block 316, the method converts the thermistor output data to direct temperature data. Processor 106 may convert the output data from thermistor 133 into direct temperature data.

At block 317, the method ignores the stored thermistor output data if the method detects a large spike (i.e., a large sudden change) in the temperature of the XO that surpasses a certain threshold. Processor 106 may ignore the stored thermistor output data and direct navigation engine 108 to search for the positioning satellite over the largest necessary search time window accounting for the worst case frequency change scenario if a large spike that exceeds a predetermined threshold in the temperature of XO 112 is detected. Such large spike may indicate a system error.

At block 318, the method uses the direct temperature data to determine the frequency changes of the XO. Processor 106 may use S-curve 200 to determine the frequency changes of XO 112 that occurred during the sleep mode.

At block 320, the method determines the timing error of the system timer based on the frequency changes of the XO that occurred during the sleep mode. The method may determine the timing error dynamically whenever a new thermistor temperature data is received during the sleep mode instead of determining the timing error after waking up from the sleep mode. Based on the frequency changes of XO 112 that occurred during the sleep mode, processor 106 determines the timing error that occurred in system timer 104 during the sleep mode.

At block 322, the method determines the actual duration of the sleep mode based on the determined timing error caused by the frequency changes and drifts of the XO. For example, if the timing error was determined to be +0.5 seconds and the duration of the sleep mode is supposed to be 10 seconds, the adjusted actual duration of the sleep mode is now determined to be 10.5 seconds instead of 10 seconds. Processor 106 determines the timing error of system timer 104 and the actual duration of the sleep mode. Processor 106 determines the actual duration of the sleep mode by adjusting the duration timed by system timer 104 by the determined timing error.

At block 324, the method locates the positioning satellite based on the actual duration of the sleep mode instead of the duration set in the system timer. Navigation engine 108 receives the actual duration of the sleep mode from processor 106 and uses the actual duration to locate the positioning satellite.

Figure 3C:
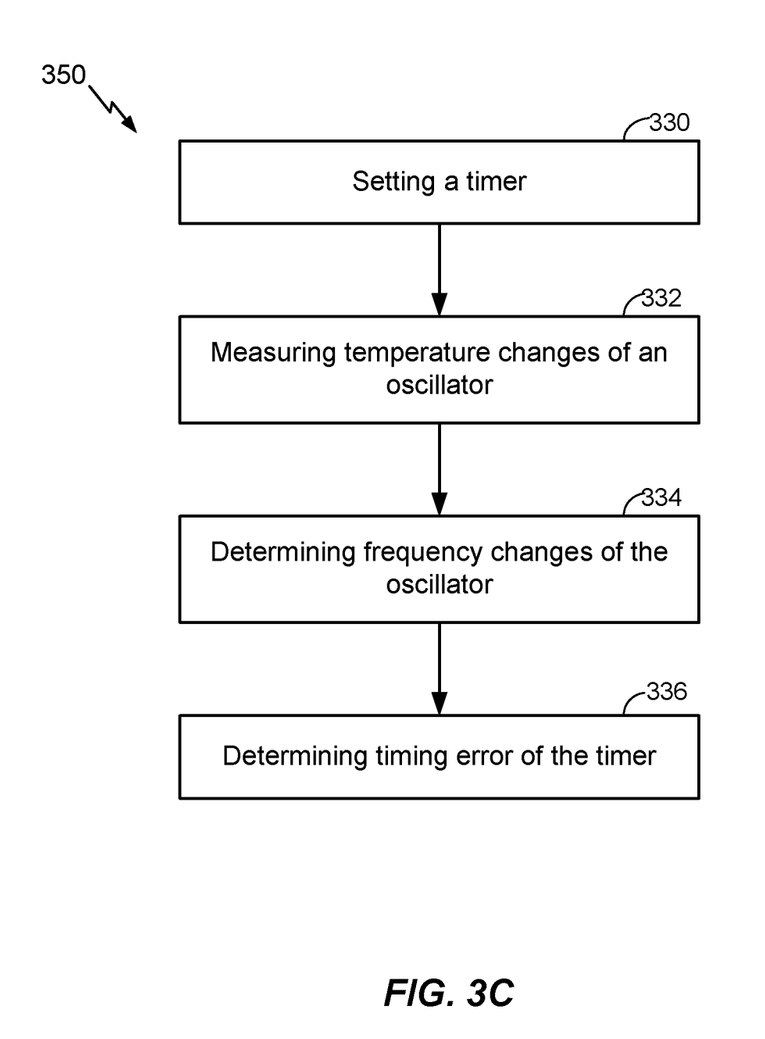
FIG. 3C illustrates a flowchart corresponding to a method of timing error adjustment according to another aspect of the disclosure.

FIG. 3C shows a method 350 for adjusting a timing error in a mobile device in accordance to another aspect of the disclosure. The method may be performed by a device, such as device 100 including processor 106, PMIC controller 116 and timing adjuster 110. In one configuration, the method 350 described in FIG. 3C may be performed by the mobile device 400 described below with reference to FIG. 4.

At block 330, the method 350 sets a system timer to time the duration of the sleep mode. The duration may be predetermined, and the system timer times the duration. Processor 106 may set system timer 104 to time the duration of the sleep mode.

At block 332, during the sleep mode, the method 350 measures and monitors the temperature of an XO such as XO 112 by using a thermistor such as thermistor 113. The thermistor outputs temperature data of the XO.

At block 334, the method 350 uses the direct temperature data to determine the frequency changes of the XO. Processor 106 may use S-curve 200 to determine the frequency changes of XO 112 that occurred during the sleep mode.

At block 336, the method 350 determines the timing error of the system timer based on the frequency changes of the XO that occurred during the sleep mode. The method may determine the timing error dynamically whenever a new thermistor temperature data is received during the sleep mode instead of determining the timing error after waking up from the sleep mode. Based on the frequency changes of XO 112 that occurred during the sleep mode, processor 106 determines the timing error that occurred in system timer 104 during the sleep mode.

Figure 4:
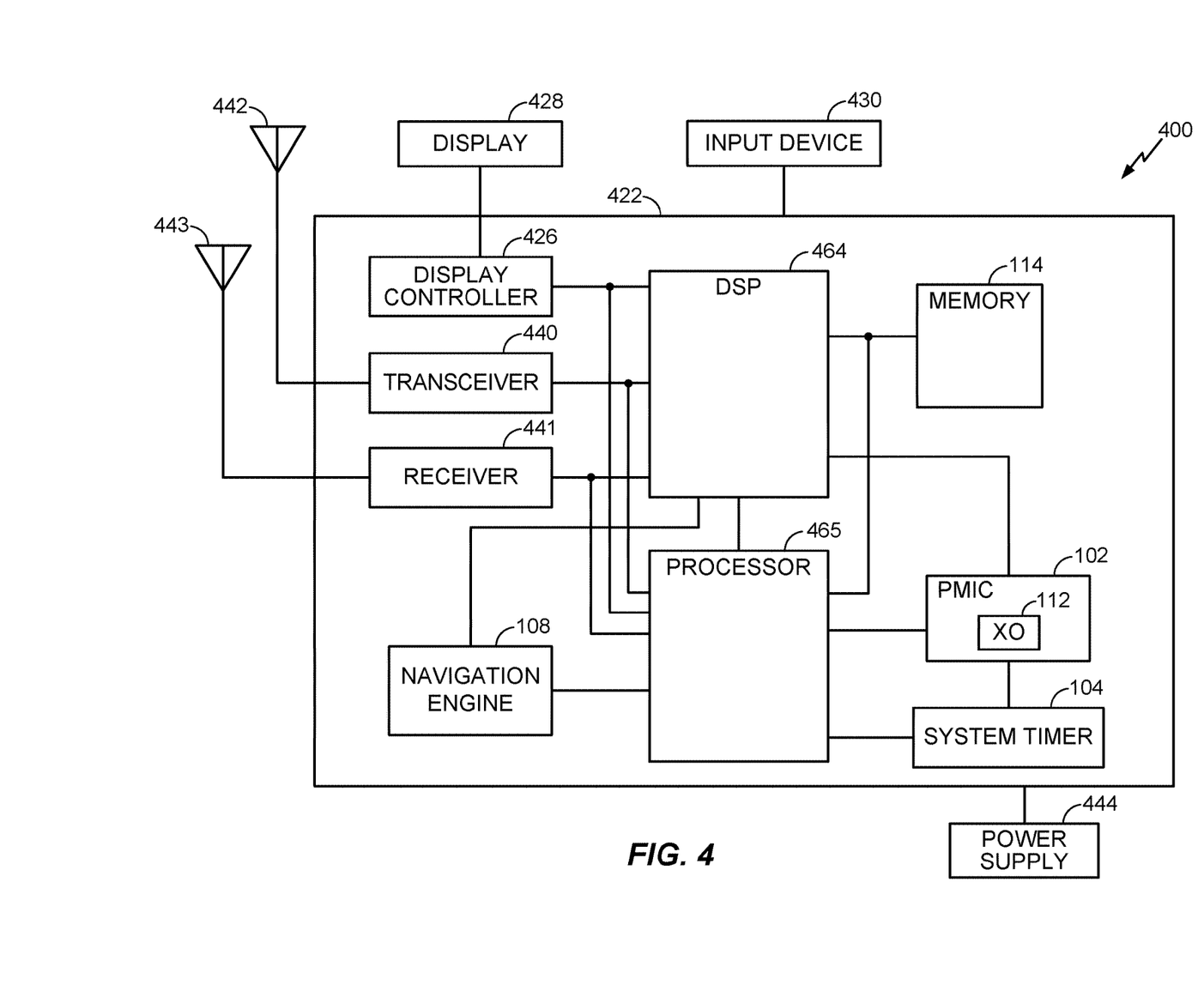
FIG. 4 illustrates an exemplary implementation of a wireless communication device configured for timing error adjustment according to various aspects of the disclosure.

With reference now to FIG. 4, another exemplary device 400 implemented as a wireless communication system is illustrated. Device 400 is similar to device 100 in many exemplary aspects, and the depiction and description of device 400 includes various additional exemplary components not shown with relation to device 100 in FIG. 1. As shown in FIG. 4, device 400 includes digital signal processor (DSP) 464 and a general purpose processor, depicted as processor 465. The above-described functions and methods related to timing error adjustment can be performed in DSP 464 or processor 465 or any combination of the processing elements thereof. Accordingly, in some aspects, processor 465 may be configured to perform operations described with regard to processor 106, but it will be understood that some of the operations related to timing error adjustment can be performed in DSP 464, and moreover, these operations can be implemented in any suitable combination of hardware and software. Both DSP 464 and processor 465 may be coupled to PMIC 102 that includes XO 112 as previously described and to memory 114. Navigation engine 108 can be coupled to DSP 464 and processor 465. Display controller 426 can be coupled to DSP 464, processor 465, and to display 428. Other components, such as transceiver 440 (which may be part of a modem) and receiver 441 are also illustrated. Transceiver 440 can be coupled to wireless antenna 442, which may be configured to receive wireless signals from a calibrated terrestrial source such as WWAN, CDMA, etc. Receiver 441 can be coupled to a satellite or GNSS antenna 443, which may be configured to receive wireless signals from satellites or GNSS signals. System timer 104 is also illustrated and may be coupled to PMIC 102 and processor 465. System timer 104 uses the output of XO 112 as its source for timing. In a particular aspect, DSP 464, processor 465, display controller 426, memory 114, navigation engine 108, transceiver 440, receiver 441, PMIC 102, and system timer 104 are included in a system-in-package or system-on-chip device 422.

In a particular aspect, input device 430 and power supply 444 are coupled to the system-on-chip device 422. Moreover, in a particular aspect, as illustrated in FIG. 4, display 428, input device 430, wireless antenna 442, GNSS antenna 443, and power supply 444 are external to the system-on-chip device 422. However, each of display 428, input device 430, wireless antenna 442, GNSS antenna 443, and power supply 444 can be coupled to a component of the system-on-chip device 422, such as an interface or a controller.

In one aspect, one or both of DSP 464 and processor 465, in conjunction with one or more remaining components illustrated in FIG. 4, can include logic/means to perform timing error adjustment as discussed, for example, in Blocks 302-320 of FIGS. 3A and 3B. For example, DSP 464, PMIC controller 116 and/or processor 465 can include logic/means to implement functions related to storing current time and location in a memory; setting a system timer to time a sleep mode; entering into the sleep mode; measuring and monitoring the temperature of an XO by using a thermistor; storing the output data from the thermistor in the memory; waking up from the sleep mode; filtering the thermistor data; convert thermistor data into direct temperature data; determine frequency changes of the XO based on the direct temperature data; determine the timing error that may have occurred in the duration of the sleep mode based on the frequency changes; determine the actual duration of the sleep mode; and locate a positioning satellite using the actual duration of the sleep mode It should be noted that although FIG. 4 depicts a wireless communications device, DSP 464, processor 465, and memory 114 may also be integrated into a device, selected from the group consisting of a set-top box, a music player, a video player, an entertainment unit, a navigation device, a communications device, a personal digital assistant (PDA), a fixed location data unit, or a computer. Moreover, such a device may also be integrated in a semiconductor die.

Accordingly it will be appreciated from the foregoing that at least one aspect includes a mobile device having an oscillator (e.g., XO 112) and a timer (e.g., system timer 104) coupled to the oscillator to receive oscillation signals from the oscillator. A thermistor (e.g., thermistor 113) is coupled to the oscillator to measure temperature changes of the oscillator. A processor (e.g., processor 106, 465) is configured to set the timer to time a duration (e.g., duration of a sleep mode), determine frequency changes of the oscillation signals from the oscillator that occurred during the duration based on the measured temperature changes that occurred during the duration, and determine a timing error of the timer that occurred while timing the duration based on the determined frequency changes of the oscillator. The various aspects disclosed advantageously allows the mobile device to determine the actual duration of the sleep mode, which allows for a more accurate time reference when coming out of the sleep mode. This provides for faster acquisition of navigation satellites, power savings and improved position accuracy.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable media embodying a method for timing error adjustment. Accordingly, the disclosure is not limited to illustrated examples and any means for performing the functionality described herein are included in aspects of the disclosure.

While aspects of the above-described aspects are generally described in relation to GNSS-based positioning systems, it will be readily appreciated how these aspects could be modified to conform with other types of positioning systems, including but not limited to satellite positioning systems (SPSs) that do not comprise a GNSS, positioning systems that are based upon pseudolites (or pseudo-satellites, e.g., ground-based transceivers) and so on. Therefore, the aspects described herein can be readily incorporated within non-GNSS-based systems.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

The foregoing disclosed devices and methods are typically designed and are configured into GDSII and GERBER computer files, stored on a computer readable media. These files are in turn provided to fabrication handlers who fabricate devices based on these files. The resulting products are semiconductor wafers that are then cut into semiconductor die and packaged into a semiconductor chip. The chips are then employed in devices described above.

What is claimed is:

1. A method of adjusting a timing error in a mobile device, the method comprising:
   setting a timer to time a duration;
   measuring temperature changes of an oscillator used as a source for the timer during the duration;
   storing the measured temperature changes of the oscillator in a memory;
   filtering the stored temperature changes;
   determining frequency changes of the oscillator that occurred during the duration based on the filtered temperature changes in response to a detection that the stored temperature changes do not exceed a predetermined threshold;
   determining the frequency changes of the oscillator to be a worst case frequency change in response to a detection that at least one of the stored temperature changes exceeds the predetermined threshold; and
   determining the timing error of the timer while timing the duration based on the frequency changes of the oscillator.

2. The method of claim 1, further comprising:
   determining an actual duration by adjusting the duration based on the determined timing error.

3. The method of claim 2, further comprising:
   locating a satellite based on the actual duration.

4. The method of claim 1, further comprising:
   ignoring the stored temperature changes when the change in the temperature changes exceeds the predetermined threshold.

5. The method of claim 1, wherein the temperature changes are measured by a thermistor.

6. The method of claim 1, wherein the duration corresponds to a time of a sleep mode of the mobile device.

7. The method of claim 6, further comprising:
   entering into the sleep mode after the setting of the timer; and
   waking up from the sleep mode after the timer finishes timing the duration.

8. A mobile device comprising:
   an oscillator;
   a timer coupled to the oscillator to receive oscillation signals from the oscillator;
   a thermistor coupled to the oscillator to measure temperature changes of the oscillator; and
   a processor configured to:
      set the timer to time a duration;
      measure the temperature changes of the oscillator during the duration;
      store the measured temperature changes of the oscillator in a memory;
      filter the stored temperature changes;

determine frequency changes of the oscillation signals from the oscillator that occurred during the duration based on the filtered temperature changes in response to a detection that the stored temperature changes do not exceed a predetermined threshold;

determine the frequency changes of the oscillation signals to be a worst case frequency change in response to a detection that at least one of the stored temperature changes exceeds the predetermined threshold; and determine a timing error of the timer that occurred while timing the duration based on the determined frequency changes of the oscillator.

9. The mobile device of claim 8, wherein the processor is configured to determine an actual duration by adjusting the duration based on the determined timing error.

10. The mobile device of claim 9, further comprising:
a navigation engine configured to locate a satellite based on the actual duration.

11. The mobile device of claim 8, wherein the processor is configured to ignore the stored temperature changes when the change in the stored temperature changes exceeds the predetermined threshold.

12. The mobile device of claim 8, wherein the duration corresponds to a time of a sleep mode of the mobile device.

13. The mobile device of claim 12, wherein the processor is configured to enter the mobile device into the sleep mode after setting the timer and wake up the mobile device from the sleep mode after the timer has finished timing the duration.

14. A mobile device comprising:
means for setting a timer to time a duration;
means for measuring temperature changes of an oscillator used as a source for the timer during the duration;
means for storing the measured temperature changes in a memory;
means for filtering the stored temperature changes;
means for determining frequency changes of the oscillator that occurred during the duration based on the filtered temperature changes in response to a detection that the stored temperature changes do not exceed a predetermined threshold;
means for determining the frequency changes of the oscillator to be a worst case frequency change in response to a detection that at least one of the stored temperature changes exceeds the predetermined threshold; and
means for determining a timing error of the timer while timing the duration based on the determined frequency changes of the oscillator.

15. The mobile device of claim 14, further comprising:
means for determining an actual duration by adjusting the duration based on the determined timing error.

16. The mobile device of claim 15, further comprising:
means for locating a satellite based on the actual duration.

17. The mobile device of claim 14, further comprising:
means for ignoring the stored temperature changes when the change in the stored temperature changes exceeds the predetermined threshold.

18. The mobile device of claim 14, wherein the temperature changes are measured by a thermistor.

19. The mobile device of claim 14, wherein the duration corresponds to a time of a sleep mode of the mobile device.

20. A non-transitory computer-readable storage medium comprising code, which, when executed by a processor, causes the processor to perform operations for adjusting a timing error in a mobile device, the non-transitory computer-readable storage medium comprising:
code for setting a timer to time a duration;
code for measuring temperature changes of an oscillator used as a source for the timer during the duration;
code for storing the measured temperature changes in a memory;
code for filtering the stored temperature changes;
code for determining frequency changes of the oscillator that occurred during the duration based on the filtered temperature changes in response to a detection that the stored temperature changes do not exceed a predetermined threshold;
code for determining the frequency changes of the oscillator to be a worst case frequency change in response to a detection that at least one of the stored temperature changes exceeds the predetermined threshold; and
code for determining the timing error of the timer while timing the duration based on the frequency changes of the oscillator.

21. The non-transitory computer-readable storage medium of claim 20, further comprising:
code for determining an actual duration by adjusting the duration based on the determined timing error.

22. The non-transitory computer-readable storage medium of claim 21, further comprising:
code for locating a satellite based on the actual duration.

23. The non-transitory computer-readable storage medium of claim 20, further comprising:
code for ignoring the stored temperature changes when the change in the stored temperature changes exceeds the predetermined threshold.

24. The non-transitory computer-readable storage medium of claim 20, wherein the duration corresponds to a time of a sleep mode of the mobile device.

* * * * *